US010669975B2

(12) United States Patent
Hensinger

(10) Patent No.: US 10,669,975 B2
(45) Date of Patent: Jun. 2, 2020

(54) FILTER ELEMENT AND ASSOCIATED FILTER APPARATUS

(71) Applicant: Mahle International GmbH, Stuttgart (DE)

(72) Inventor: Heiko Hensinger, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/216,996

(22) Filed: Dec. 11, 2018

(65) Prior Publication Data

US 2019/0203674 A1 Jul. 4, 2019

(30) Foreign Application Priority Data

Dec. 12, 2017 (DE) .................. 10 2017 222 526

(51) Int. Cl.
*F02M 35/02* (2006.01)
*F02M 35/08* (2006.01)
(Continued)

(52) U.S. Cl.
CPC ....... *F02M 35/02483* (2013.01); *B01D 29/21* (2013.01); *B01D 35/153* (2013.01);
(Continued)

(58) Field of Classification Search
CPC ......... F01N 2900/1606; F01N 2550/04; F01N 3/021; F01M 11/03; F01M 2001/1064;
(Continued)

(56) References Cited

U.S. PATENT DOCUMENTS 5,593,577 A * 1/1997 Imai ..................... B01D 35/147
210/232
6,464,872 B1 * 10/2002 Honda .................. B01D 29/111
210/416.4
(Continued)

FOREIGN PATENT DOCUMENTS

DE        202005003047 U1   7/2006
DE     20 2011 104691 U1   1/2012
(Continued)

OTHER PUBLICATIONS

European search report dated Apr. 4, 2019.
(Continued)

*Primary Examiner* — Long T Tran
(74) *Attorney, Agent, or Firm* — Fishman Stewart PLLC

(57) ABSTRACT

A filter element of at least one of a vehicle and an internal combustion engine may include an annular filter body, an inner frame supporting the filter body, an upper end plate and a lower end plate arranged axially on the filter body, a pin eccentrically arranged on the lower end plate, a plurality of centring elements, and a positioning web. The annular filter body may surround a cylindrical inner space. The plurality of centring elements may be arranged distributed in a circumferential direction of the filter body around the first plate opening, protrude axially into the inner space, and respectively have a chamfer. The positioning web may be arranged on at least one of the upper end plate and the inner frame in the circumferential direction between two centring elements of the plurality of centring elements and extend parallel to the two centring elements.

20 Claims, 3 Drawing Sheets

(51) Int. Cl.

| | | |
|---|---|---|
| *F02M 35/024* | (2006.01) | |
| *F02M 37/50* | (2019.01) | |
| *B01D 46/00* | (2006.01) | |
| *B01D 35/153* | (2006.01) | |
| *F02M 37/42* | (2019.01) | |
| *B01D 29/21* | (2006.01) | |
| *F01M 11/03* | (2006.01) | |
| *B01D 35/16* | (2006.01) | |
| *F01M 1/10* | (2006.01) | |

(52) U.S. Cl.
CPC ......... *B01D 35/16* (2013.01); *B01D 46/0087* (2013.01); *F01M 1/10* (2013.01); *F01M 11/03* (2013.01); *F02M 37/42* (2019.01); *F02M 37/50* (2019.01); *B01D 2201/291* (2013.01); *B01D 2201/316* (2013.01); *B01D 2201/4015* (2013.01); *B01D 2201/4046* (2013.01); *B01D 2279/60* (2013.01); *F01M 2011/031* (2013.01)

(58) Field of Classification Search
CPC ........ F02M 37/22; F02M 37/50; F02M 35/02; F02M 35/02483; F02M 35/08; F02M 37/42; F02M 37/44
See application file for complete search history.

(56) References Cited

U.S. PATENT DOCUMENTS

| | | | |
|---|---|---|---|
| 9,011,683 B2 | 4/2015 | South et al. | |
| 2002/0166809 A1* | 11/2002 | Wehrum | B01D 29/114 |
| | | | 210/435 |
| 2008/0060994 A1* | 3/2008 | Yano | B01D 35/147 |
| | | | 210/442 |
| 2008/0272046 A1* | 11/2008 | Lampert | B01D 29/21 |
| | | | 210/312 |
| 2009/0090668 A1 | 4/2009 | Abdalla et al. | |
| 2017/0296955 A1* | 10/2017 | Ishida | B04B 5/005 |

FOREIGN PATENT DOCUMENTS

| | | |
|---|---|---|
| DE | 112009003499 T5 | 5/2012 |
| DE | 10 2013 209662 A1 | 11/2014 |
| DE | 10 2015 222359 A1 | 5/2017 |
| EP | 2364763 B1 | 7/2013 |

OTHER PUBLICATIONS

English abstract translation of DE-102015222359.
English abstract translation of DE-202011104691.
English abstract translation DE-10 2013 209662.
English abstract for DE-202005003047.
English abstract for EP-2364763.

* cited by examiner

FILTER ELEMENT AND ASSOCIATED FILTER APPARATUS

CROSS-REFERENCE TO RELATED APPLICATION

This application claims priority to German Patent Application No. DE 10 2017 222 526.2, filed on Dec. 12, 2017, the contents of which are hereby incorporated by reference in its entirety.

TECHNICAL FIELD

The present invention relates to a filter element with an annular filter body composed of a filter material, which surrounds a cylindrical inner space. The invention furthermore relates to a filter apparatus with at least one such filter element.

BACKGROUND

EP 2 364 763 B1 discloses a generic filter element, in particular an air filter for a fresh-air system of a vehicle and/or an internal combustion engine which has an annular filter body composed of a filter material. An inner frame is likewise provided on which the filter body is supported radially on the inside as well as an upper end plate which is arranged axially on the filter body and has a central plate opening.

DE 20 2005 003 047 U1 discloses a liquid filter with an exchangeable filter insert which has a filter medium, wherein the liquid filter has a filter bypass valve which opens upon exceeding of a predetermined liquid pressure and enables a liquid flow from the dirty to the clean side of the filter while bypassing the filter medium. The filter bypass valve possesses in this case a movable valve body as well as a sealing surface which is assigned thereto, wherein the latter is arranged on the exchangeable filter insert and surrounds a valve opening. The valve body is furthermore assigned a projection which extends through the valve opening. As a result of this, it should be possible to achieve an improved inflow to the filter bypass valve.

Filter apparatuses for internal combustion engines are generally composed of a filter housing and a filter element which can be exchanged in the event of a service. Specifically in the case of complexly formed filter elements, problems can arise during the installation of the filter element in the housing since the filter element is not properly guided in the housing. A misalignment of the filter element relative to the functional carrier or to the filter housing can arise in particular during installation, which can bring about a tilting and under certain circumstances also a material fracture at the filter element or at the functional carrier or at the filter housing.

SUMMARY

The present invention therefore deals with the problem of indicating an improved or at least an alternative embodiment for a filter element of the generic type, which embodiment overcomes in particular the disadvantages known from the prior art and enables in particular a simplified installation in a filter housing of a filter apparatus.

This problem is solved according to the invention by the subject matter of the independent claim(s). Advantageous embodiments are the subject matter of the dependent claim(s).

The present invention is based on the general concept of providing special centring elements on a filter element which is known per se in the region of an upper end plate or an inner frame in the region of the upper end plate, which centring elements bring about forced centring and thus forced guidance of the filter element during installation into a filter housing of a filter apparatus and as a result prevent a tilting of the filter element relative to a filter housing or a riser pipe in the filter housing, as a result of which in particular damage to the riser pipe or to the filter element can be reliably avoided. In order to be able to additionally simplify mounting and production, a positioning web can furthermore also be provided in the region of the upper end plate and/or on the inner frame which brings about a rotational alignment of the filter element and thus reliable introduction of a pin of the filter element into an associated idling duct of the filter apparatus. The filter element according to the invention, which can be, for example, an air filter, an oil filter or a fuel filter of a vehicle and/or an internal combustion engine, has an annular filter body composed of a filter material which surrounds a cylindrical inner space. An inner frame on which the filter body is supported radially on the inside as well as an upper end plate which is arranged axially on the filter body and possesses a central first plate opening are also provided. The filter element furthermore possesses a lower end plate which is also arranged axially on the filter body and which also has a central plate opening which is further referred to as a second plate opening and on which an eccentrically arranged or axially protruding pin for sealing off the idling duct is arranged. According to the invention, several centring elements arranged distributed in the circumferential direction around the first plate opening and protruding axially into the inner space are thus provided, the longitudinal ends of which that face away from the upper end plate are chamfered in such a manner that an axial length of the centring elements is smaller radially on the inside than radially on the outside. The centring elements therefore possess a chamfer. A positioning web is furthermore provided which is arranged on the upper end plate and/or on the inner frame in the circumferential direction between two centring elements and which runs parallel to these. This has the great structural advantage that both the positioning web required for rotational alignment of the annular filter element and the centring elements responsible for simple installation can be combined in the region of the upper end plate, as a result of which production can be simplified. This is in particular possible in so far as both the centring elements and the positioning element are produced using the plastic injection moulding method since in this case joint production, for example, of the upper end plate and/or the inner frame together with the centring elements or the positioning web is enabled. Alternatively, the centring elements and/or the positioning web can be embodied on a separate component within the assembly. It is in particular conceivable that the centring elements and/or the positioning web are formed as separate components which are connected, in particular clipped or glued, to the end plate and/or the inner frame. With the filter element according to the invention, a tilting thereof can overall be avoided during installation and thus the risk of damage during installation of the filter element into the filter apparatus can be at least reduced.

In the case of one advantageous further development of the solution according to the invention, the positioning web is formed to be shorter in the axial direction than the centring elements. This has the great advantage that initially during insertion of the filter element into a filter housing of a filter apparatus a centring of the filter element is carried out via the centring elements before the positioning web interacts with a positioning contour arranged, for example, in a riser pipe of a functional carrier. A pre-alignment of the filter element relative to the riser tube or relative to the functional carrier or relative to the filter housing is thus already forced as a result of the shorter formation according to the invention of the positioning web, as a result of which installation can be simplified.

In the case of one advantageous further development of the solution according to the invention, at least three, preferably four, six or more centring elements are provided. At least three centring elements are required in order to bring about a reliable centring of the filter element relative to the riser pipe or relative to the filter housing of the filter apparatus. The provision of at least three centring elements offers the possibility of particularly resource-sparing production which reduces costs and saves installation space.

In the case of one advantageous further development of the solution according to the invention, an axially protruding connecting piece is arranged on the upper end plate of the filter element, wherein at least the centring elements extend into the connecting piece. This enables an axially longer formation of the centring elements and as a result axially improved guidance of the filter element on a riser pipe since such a riser pipe normally has an outer diameter which substantially corresponds to an inner diameter of the centring elements so that the filter element can be pushed with its centring elements onto the riser pipe and can be guided thereon.

The invention is further based on the general concept of indicating a filter apparatus, in particular an air filter, an oil filter or a fuel filter of a motor vehicle and/or an internal combustion engine, with at least one filter element described in the previous paragraphs, wherein a riser pipe is arranged in a filter housing of the filter apparatus, which riser pipe acts, for example, as a clean duct and which has, at a longitudinal end facing the upper end plate, a positioning contour, for example, in the form of a tube-like chamfer. An inner diameter of the centring elements corresponds substantially to an outer diameter of the riser pipe, as a result of which the guide function described in the previous paragraph can be realized. A rotational alignment of the filter element relative to the filter housing of the filter apparatus can be forcibly brought about via the positioning contour which interacts with the positioning web of the filter element, as a result of which a flush alignment of the pin of the filter element relative to an idling duct in the filter housing can be realized comparatively easily.

In one advantageous further development of the filter apparatus according to the invention, an axial groove for receiving the positioning web is arranged at a lowest point of the positioning contour. By rotating the filter element relative to the filter housing, the positioning web of the filter element slides along the positioning contour on the riser pipe until the positioning web is arranged flush with the axial groove of the positioning contour and can be introduced into it. In this position in which the positioning web is formed axially flush with the axial groove, the filter element-side pin is also aligned in the axial direction flush with the filter housing-side idling duct so that, by axial displacement of the filter element relative to the filter housing, the pin can be introduced into the idling duct and the positioning web can be introduced into the axial groove. Of course, other positioning contours are also purely theoretically conceivable, for example, in the manner of a helical line, at the lowest point of which the axial groove is arranged.

Further important features and advantages of the invention will become apparent from the subordinate claims, from the drawings and from the associated description of the figures on the basis of the drawings.

It will be obvious that the above-mentioned features and the features which are still to be explained below cannot only be used in the respectively indicated combination, but also in other combinations or on their own without departing from the scope of the present invention.

Preferred exemplary embodiments of the invention are represented in the drawings and are explained in greater detail in the following description, wherein identical reference numbers relate to identical or similar or functionally identical components.

BRIEF DESCRIPTION OF THE DRAWINGS

Schematically in each case.

DETAILED DESCRIPTION

Figure 1:
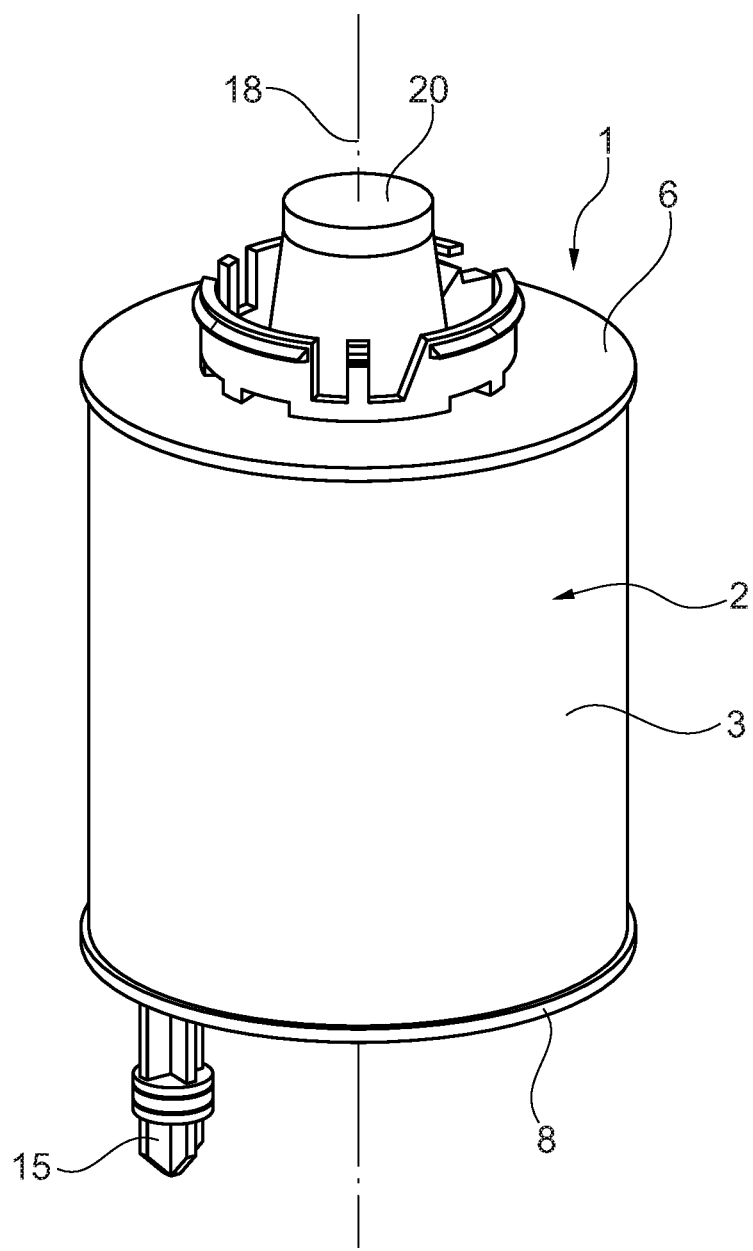
FIG. 1 shows a view of a filter element according to the invention.
Figure 2:
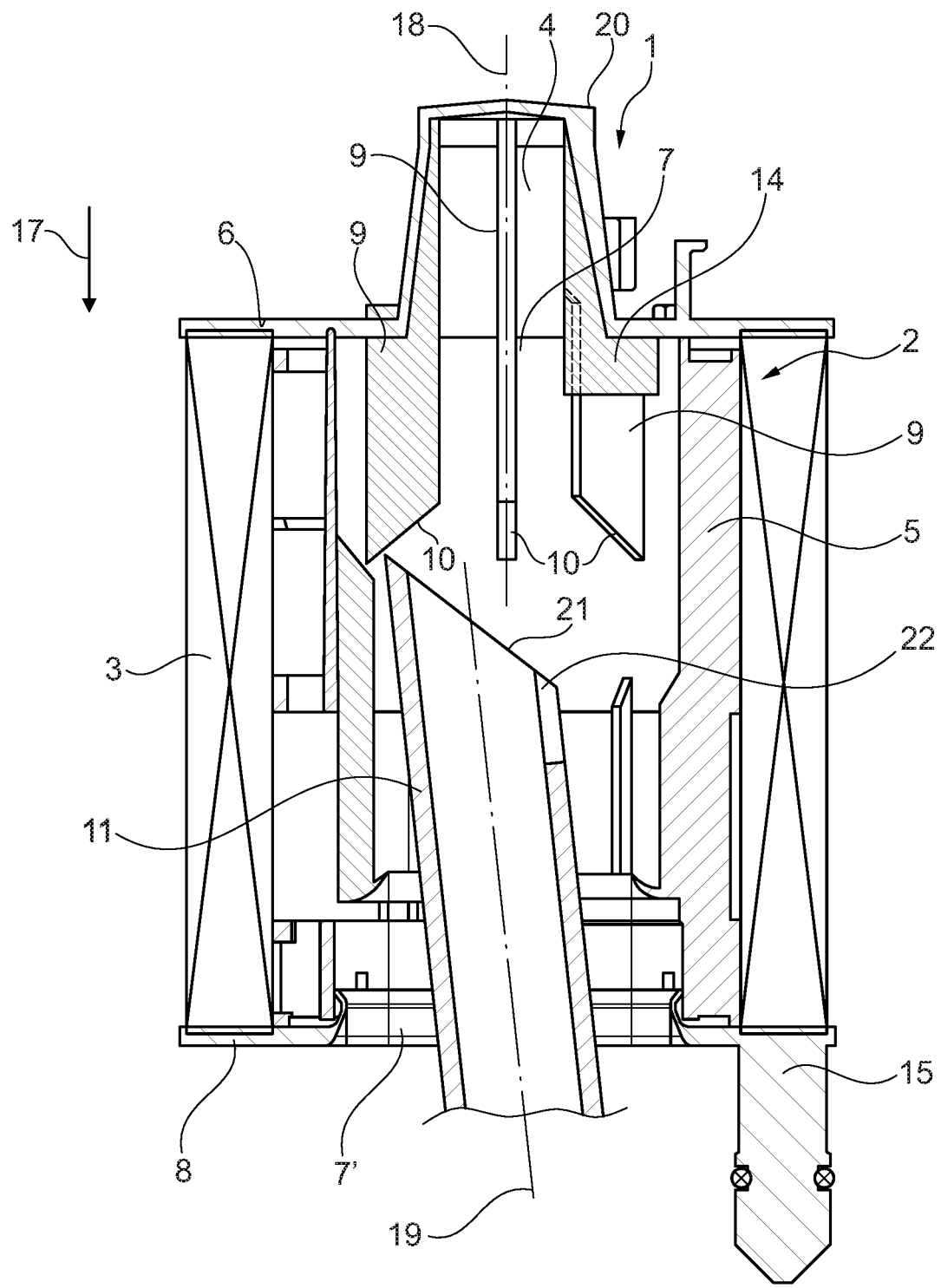
FIG. 2 shows a sectional representation through a filter apparatus according to the invention in the case of a filter element inserted obliquely with respect to an axis of the filter apparatus.
Figure 3:
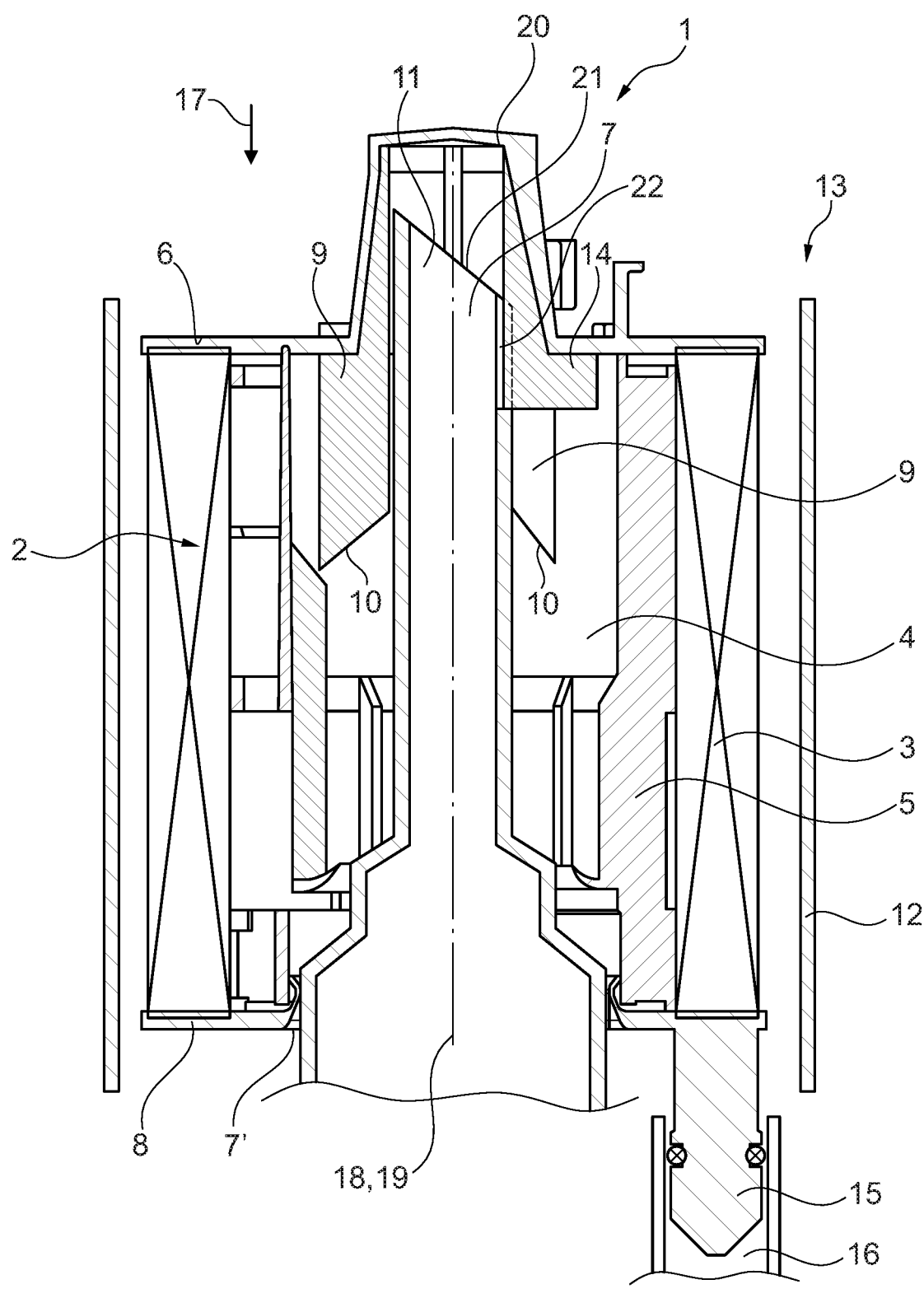
FIG. 3 shows a representation as in FIG. 2, but in the case of axes of the filter element and of the filter apparatus running in parallel or identically.

In accordance with FIGS. 1 to 3, a filter element 1 according to the invention, which can be formed, for example, as an air filter, as an oil filter or as a fuel filter of a vehicle and/or an internal combustion engine, has an annular filter body 2 composed of a filter material 3 which surrounds a cylindrical inner space 4 (cf. in particular FIGS. 2 and 3). An inner frame 5 is also provided on which filter body 2 is supported radially on the inside. Filter element 1 according to the invention is closed towards the top in a familiar manner via an upper end plate 6 which is arranged axially on filter body 2 and has a central first plate opening 7. Filter body 2 is closed toward the bottom in the axial direction of (annular) filter element 1 via a lower end plate 8 which has a central second plate opening 7'. According to the invention, several centring elements 9 arranged distributed in the circumferential direction around first plate opening 7 and protruding axially into inner space 4 are thus provided, the longitudinal ends of which that face away from upper end plate 6 are chamfered and as a result have a chamfer 10 so that an axial length of centring elements 9 is smaller radially on the inside than radially on the outside. Said centring elements 9 with their chamfers 10 bring about simplified pushing of filter element 1 onto a riser pipe 11 which is arranged, for example, on a functional carrier, not designated in greater detail, in a filter housing 12 of a filter apparatus 13. There is furthermore provided a positioning web 14 which is arranged on upper end plate 6 and/or on inner frame 5 in the circumferential direction between two adjacent centring elements 9 and runs parallel to these. A rotational alignment of pin 15, which is arranged eccentrically on lower end plate 8 and protrudes axially, relative to a filter housing-side idling duct 16 is possible via positioning web 14 so that, in the case of filter element 1 according to the invention, both centring elements 9 and positioning web 14 are arranged on upper end plate 6 or on inner frame 5, in particular are even formed in one piece with this and facilitate an installation of filter element 1 into filter housing 12 of filter apparatus 13, for example, an air filter, a fuel filter or an oil filter. If considering FIGS. 2 and 3, it is apparent that positioning web 14 is formed to be shorter in axial direction 17 than centring elements 9 so that, in the event of installation of filter element 1 according to the invention into filter apparatus 13, positioning elements 9 initially bring about parallel or identical alignment of a filter element axis 18 relative to a riser pipe axis 19.

If further considering filter element 1 according to the invention, it is apparent that an axially protruding connecting piece 20 is arranged on upper end plate 6, wherein at least centring elements 9 extend into connecting piece 20. Positioning web 14 can also likewise extend into connecting piece 20.

As is apparent from FIG. 3, filter apparatus 13 according to the invention has filter housing 12 described above with riser tube 11 arranged therein which has, at a free longitudinal end facing upper end plate 6, a positioning contour 21 in the form of a chamfer. It is naturally clear that positioning contour 21 does not have to be formed in the manner of a tube-like chamfer, rather can also form a screw thread. An axial groove 22 for receiving positioning web 14 is arranged at a lowest point of positioning contour 21.

An inner diameter of centring elements 9 corresponds to an outer diameter of riser pipe 11 or is slightly larger than an outer diameter of riser pipe 11, as a result of which guiding of filter element 1 can be performed by its centring elements 9 on riser pipe 11. Overall, at least three, four, preferably even six or more, centring elements 9 are provided.

In order to be able to explain the effect according to the invention of filter element 1 according to the invention in greater detail, the mounting process of filter element 1 in filter apparatus 13 is discussed in greater detail.

For mounting of filter element 1 in filter housing 12 of filter apparatus 13, this is initially inserted from above, wherein, in the case of an initially occurring inclination of filter element axis 18 with respect to riser pipe axis 19, no difficulties occur as hitherto since riser pipe 11 moves with its positioning contour 21, in particular with its upper tip of positioning contour 21 initially across chamfers 10 of centring elements 9 or at least along a chamfer 10 at least of a centring element 9 and as a result aligns filter element 1 relative to riser pipe 11. As soon as positioning web 14 of filter element 1 comes into contact with positioning contour 21 of riser tube 11, a rotation and simultaneously an axial adjustment of filter element 1 occur in filter housing 12. If positioning web 14 reaches riser pipe-side axial groove 22, pin 15 is aligned flush with filter housing-side idling duct 16 and no rotation of filter element 1 occurs any more, rather only an axial displacement of filter element 1 in filter housing 12 of filter apparatus 13, in the case of which pin 15 is pushed into idling duct 16 and closes it off. In particular a tilting of filter element 1 relative to riser pipe 11 can thus be avoided with centring elements 9 according to the invention, as a result of which in particular the risk of damage, for example, as a result of breaking off of parts, to filter element 1 and/or riser pipe 11 can be prevented. Centring elements 9 with their chamfers 10 enable comparatively simple centring and alignment of filter element 1 relative to filter housing 12 and simultaneously guidance of filter element 1 since an inner diameter of centring elements 9 corresponds substantially to an outer diameter of riser pipe 11.

Low-cost production can also be enabled as a result of the one-piece formation of upper end plate 6 and/or inner frame 5 together with centring elements 9 and/or positioning web 14, in particular as a one-piece plastic injection moulded part.

It is furthermore apparent from FIGS. 2 and 3 that positioning web 14 extends radially further to the inside than centring elements 9 so that it is possible during mounting of filter element 1 in filter housing 12 of filter apparatus 13 to guide centring elements 9 of filter element 1 on an outer lateral surface of riser pipe 11, while positioning web 14 interacts with positioning contour 21 and can engage into axial groove 22 of positioning contour 21, which is not possible for centring elements 9.

The invention claimed is:

1. A filter element of at least one of a vehicle and an internal combustion engine, comprising:
    an annular filter body, composed of a filter material, surrounding a cylindrical inner space;
    an inner frame on which the filter body is supported radially on an inside;
    an upper end plate arranged axially on the filter body and having a central first plate opening;
    a lower end plate arranged axially on the filter body and having a central second plate opening;
    an axially protruding pin configured to close an idling duct eccentrically arranged on the lower end plate;
    a plurality of centring elements arranged distributed in a circumferential direction of the filter body around the first plate opening, protruding axially into the inner space, and respectively having a chamfer, wherein an axial length of the plurality of centring elements is smaller radially on an inside than radially on an outside; and
    a positioning web arranged on at least one of the upper end plate and the inner frame in the circumferential direction between two centring elements of the plurality of centring elements and extending parallel to the two centring elements.

2. The filter element according to claim 1, wherein the positioning web is shorter in an axial direction of the filter body than the plurality of centring elements.

3. The filter element according to claim 1, wherein at least one of the upper end plate and the inner frame are integrally provided with at least one of the plurality of centring elements and the positioning web as a single piece.

4. The filter element according to claim 3, wherein the single piece is a one-piece plastic injection moulded part.

5. The filter element according to claim 1, wherein at least one of the plurality of centring elements and the positioning web are single separate unitary components connected to at least one of the upper end plate and the inner frame.

6. The filter element according to claim 1, wherein the plurality of centring elements includes at least three centring elements.

7. The filter element according to claim 1, further comprising an axially protruding connecting piece arranged on the upper end plate, wherein at least the plurality of centring elements extend into the connecting piece.

8. The filter element according to claim 7, wherein the positioning web extends into the connecting piece.

9. The filter element according to claim 1, wherein the positioning web extends radially inward further than the plurality of centring elements.

10. A filter apparatus of at least one of a motor vehicle and an internal combustion engine, comprising:
    a filter element including:
        an annular filter body, composed of a filter material, surrounding a cylindrical inner space;
        an inner frame supporting the filter body radially on an inside of the filter body;

an upper end plate having a central first plate opening arranged axially on the filter body;

a lower end plate having a central second plate opening arranged axially on the filter body;

an axially protruding pin configured to close an idling duct eccentrically arranged on the lower end plate;

a plurality of centring elements arranged around the first plate opening and distributed in a circumferential direction of the filter body, the plurality of centring elements protruding axially into the inner space and respectively having a chamfer, the plurality of centring elements respectively having a radially inner axial length smaller than a radially outer axial length; and a positioning web arranged on at least one of the upper end plate and the inner frame in the circumferential direction between two centring elements of the plurality of centring elements and extending parallel to the two centring elements;

a filter housing; and a riser pipe arranged within the filter housing, the riser pipe having, at an upper longitudinal end, a positioning contour interacting with the positioning web of the filter element;

wherein an inner diameter of the plurality of centring elements corresponds substantially to an outer diameter of the riser pipe.

11. The filter apparatus according to claim 10, further comprising an axial groove configured to receive the positioning web arranged at a point of the positioning contour axially closest to the lower end plate.

12. The filter apparatus according to claim 10, wherein the positioning web is shorter in an axial direction of the filter body than the plurality of centring elements.

13. The filter apparatus according to claim 10, wherein at least one of the upper end plate and the inner frame are integrally provided with at least one of the plurality of centring elements and the positioning web as a single piece.

14. The filter apparatus according to claim 10, wherein at least one of the plurality of centring elements and the positioning web are single separate unitary components connected to at least one of the upper end plate and the inner frame.

15. The filter apparatus according to claim 10, wherein the plurality of centring elements includes at least three centring elements.

16. The filter apparatus according to claim 10, further comprising an axially protruding connecting piece arranged on the upper end plate, wherein at least the plurality of centring elements extend into the connecting piece.

17. The filter apparatus according to claim 16, wherein the positioning web extends into the connecting piece.

18. The filter apparatus according to claim 10, wherein the positioning web extends radially inward further than the plurality of centring elements.

19. A filter element, comprising:
an annular filter body, composed of a filter material, surrounding a cylindrical inner space;

an inner frame supporting the filter body radially on an inside of the filter body;

an upper end plate having a central first plate opening arranged axially on the filter body;

a lower end plate having a central second plate opening arranged axially on the filter body;

an axially protruding pin configured to close an idling duct eccentrically arranged on the lower end plate;

a plurality of centring elements arranged around the first plate opening and distributed in a circumferential direction of the filter body, the plurality of centring elements protruding axially into the inner space and respectively having a chamfer, the plurality of centring elements respectively having a radially inner axial length smaller than a radially outer axial length; and a positioning web arranged on at least one of the upper end plate and the inner frame in the circumferential direction between two centring elements of the plurality of centring elements and extending parallel to the two centring elements;

wherein the positioning web extends radially inward further than the plurality of centring elements and is shorter than the plurality of centring elements in an axial direction of the filter body.

20. The filter element according to claim 19, further comprising an axially protruding connecting piece arranged on the upper end plate, wherein the plurality of centering elements and the positioning web extend into the connecting piece.

* * * * *